United States Patent [19]

Burke, Jr.

[11] 3,968,067

[45] July 6, 1976

[54] PROCESS FOR PREPARING HIGH POLYMER LATICES FROM ORGANIC SOLVENT DISPERSIONS

[75] Inventor: Oliver W. Burke, Jr., Fort Lauderdale, Fla.

[73] Assignee: Exxon Research and Engineering Company, Linden, N.J.

[22] Filed: June 28, 1974

[21] Appl. No.: 484,340

Related U.S. Application Data

[63] Continuation-in-part of Ser. No. 226,419, Feb. 15, 1972, Pat. No. 3,879,327, which is a continuation-in-part of Ser. No. 817,494, April 18, 1969, abandoned, which is a continuation-in-part of Ser. Nos. 621,997, March 7, 1967, Pat. No. 3,503,917, Ser. No. 691,823, Dec. 16, 1967, abandoned, Ser. No. 767,790, Oct. 15, 1968, Pat. No. 3,622,127, and Ser. No. 784,596, Dec. 18, 1968, Pat. No. 3,644,263.

[52] U.S. Cl. ............... 260/29.6 R; 260/29.6 XA; 260/29.6 PT; 260/29.6 PM; 260/29.7 R; 260/819
[51] Int. Cl.² ................. C08L 7/02; C08L 23/00
[58] Field of Search ............ 260/29.6 R, 29.6 XA, 260/29.6 PT, 29.6 PM, 29.7 R, 819

[56] References Cited
UNITED STATES PATENTS

| | | | |
|---|---|---|---|
| 2,403,966 | 7/1946 | Brown et al. | 260/29.7 B |
| 2,959,561 | 11/1960 | Kelley | 260/29.7 B |
| 3,007,852 | 11/1961 | Hunter et al. | 260/29.7 B |
| 3,129,132 | 4/1964 | Gudheim | 260/29.7 PT |
| 3,244,660 | 4/1966 | Herold | 260/34.2 |
| 3,277,037 | 10/1966 | Halper et al. | 260/29.6 XA |
| 3,281,386 | 10/1966 | Moss | 260/29.7 R |
| 3,287,301 | 11/1966 | Fysh et al. | 260/29.6 XA |
| 3,294,719 | 12/1966 | Halper et al. | 260/29.6 XA |
| 3,310,515 | 12/1966 | Halper et al. | 260/29.6 XA |
| 3,432,483 | 3/1969 | Moss | 260/29.7 R |
| 3,445,414 | 5/1969 | Glymph et al. | 260/29.6 PT |
| 3,503,917 | 3/1970 | Burke | 260/29.6 R |
| 3,644,263 | 2/1972 | Burke | 260/29.7 R |
| 3,652,482 | 3/1972 | Burke | 260/29.6 R |

*Primary Examiner*—Harold D. Anderson
*Attorney, Agent, or Firm*—Hall & Houghton

[57] ABSTRACT

This process relates to the preparation of stable aqueous latices from solvent dispersions of elastomers and other high polymer compositions. The process in common with that of earlier applications is characterized, inter alia, by the establishment of a flow of gas comprising steam as a continuous phase into which an emulsion of a cement of the polymer is dispersed as an aerosol of latex droplets in a solvent-vapor continuum, followed by coalescence of the latex droplets and separation of the resulting coalesced liquid phase from the resulting solvent-vapor phase.

In the present disclosure, special provisions are made for generating from recovered water saturated with solvent (and possibly contaminated with carry-over of macromolecular material and/or emulsifier and/or latex droplets) the gas comprising steam employed in forming the initial continuous phase. By this process it is possible to essentially exclude or eliminate the continuous supply of external steam to the process and the disposal of the condensate resulting therefrom. In the preferred practice of these provisions the quantity of water supplied to the process thus can be reduced essentially to only that quantity of water constituting the aqueous phase of the latex product withdrawn from the process, and environmental pollution with process effluent liquid and solid materials may be avoided or greatly minimized.

Furthermore, in preferred embodiments the process utilizes material carried over in or with the vapors and inhibits process solid and solvent losses and thus increases the efficiency of the process.

13 Claims, 3 Drawing Figures

PROCESS FOR PREPARING HIGH POLYMER LATICES FROM ORGANIC SOLVENT DISPERSIONS

CROSS REFERENCE TO RELATED APPLICATIONS

This application is a continuation-in-part of application Ser. No. 226,419, filed Feb. 15, 1972, now U.S. Pat. No. 3,879,327, as a continuation-in-part of my application Ser. No. 817,494, filed Apr. 18, 1969, (now abandoned), which was an improvement over and continuation-in-part of my applications (a) Ser. No. 621,997, filed Mar. 7, 1967 (now U.S. Pat. No. 3,503,917, issued Mar. 31, 1970), (b) Ser. No. 691,823, filed Dec. 16, 1967, now abandoned, (replaced by application Ser. No. 70,949, filed Sept. 10, 1970, now U.S. Pat. No. 3,652,482, issued Mar. 28, 1972), (c) Ser. No. 767,790 filed Oct. 15, 1968, (now U.S. Pat. No. 3,622,127, issued Nov. 23, 1971), and (d) Ser. No. 784,596, filed Dec. 18, 1968, (now U.S. Pat. No. 3,644,263, issued Feb. 12, 1972), the disclosures of all of which are herein included by reference.

BACKGROUND OF THE INVENTION

1. Field of the Invention:

This invention like those of my aforesaid copending applications relates to the production of high solids content aqueous latices with reduced polymer losses by a process which reduces solvent losses, conserves water and minimizes plant effluents thus reducing or eliminating waste material, and aims generally to provide improved method and apparatus combinations therefor.

The processes of the aforesaid applications, with respect to which the inventions of the present application are improvements, have solved a number of the problems of the prior art, by combinations of steps in which an aqueous dispersion of polymer cement is dispersed into a flow of steam or gas comprising steam, but in so doing consederable quantities of solvent and of water saturated with solvent and, in certain instances, of carried-over macromolecular substances have been lost.

2. Description of the Prior Art:

In the earlier prior art, synthetic latices of macromolecular material including elastomers and other high polymers were usually those prepared by emulsion polymerization, which can directly yield latices of uniform colloidal particle size. In contrast high polymers made by essentially anhydrous catalyst polymerizations must be converted into latex. In this latter case it has been proposed to prepare aqueous latices of high polymers from solvent solutions thereof by processes of the type which comprise the general steps of (1) providing a dispersion or cement of the polymer in a volatile organic solvent for the polymer, (2) adding to such dispersion water and an aqueous emulsifier therefor and emulsifying the same to produce an emulsion, (3) stripping the volatile organic solvent from the said emulsion, and (4) recovering the resulting latex product. However, in the practical art difficulty has been experienced in attempting to render such proposed processes commercially feasible, inter alis, in that the stripping of solvent from the aqueous emulsion of polymer cement has resulted in losses of valuable materials. These losses have included (a) losses of polymer, (b) losses of solvent and (c) losses of water contaminated with solvent.

SUMMARY OF THE INVENTION

The particular improvements distinguishing the present invention from those of my aforesaid copending applications may be employed in practicing any of the several embodiments of process and apparatus set forth in said applications.

In the present process the organic solvent cement of macromolecular substance as an emulsion in water is dispersed into a flow of steam and the solvent is steam stripped from the emulsion resulting in latex and vapor, and on separating and condensing said vapor there is obtained liquid solvent which may contain some water, and liquid water containing dissolved solvent. As heretofore stated said solvent and/or water may contain polymer and emulsifier carried over from the separation, and as said water contains dissolved solvent and in certain instances emulsifier and solid polymer it is useless as boiler feed water and therefore is generally passed to waste. The present process renders such contaminated water useful as process water, also, recovers from such water any solvent, polymer and emulsifier present therein and recycles same to the process, thus improving the processing economics.

In more detail, in a first embodiment of the invention a latex is prepared from an organic solvent dispersion of a composition of an organic solvent soluble or dispersible, water insoluble macromolecular substance by a process of the type which comprises: (1) providing a dispersion of the said composition in essentially water-immiscible volatile solvent which itself or as an azeotrope with water has a boiling point lower than that of water at atmospheric pressure, (2) adding water and emulsifier to said dispersion in proportions to form an emulsion having water as its continuum and emulsifying the same so that the discontinuous phase thereof is in particles at least principally of precursor latex particle size, (3) stripping the solvent from the emulsion to form a latex, and (4) recovering the latex product, and which comprises the particular steps of: (5) providing a moving flow of gas comprising steam as an initial continuous phase, (6) dispersing the said emulsion into the flow of gas comprising steam as the initial continuous phase while subjecting the phases to a decrease of pressure and maintaining the temperature thereof below the limiting temperature for stability of the emulsion of particles of precursor latex particle size, thereby vaporizing solvent from the dispersed droplets and forming latex and vapors, (7) establishing a separating zone maintained at a lower pressure, and establishing a flow of latex and vapor into said separating zone, (8) introducing into said separating zone the latex droplets and vapor produced by step (6) and impinging said droplets upon the flow of latex therein, (9) withdrawing from said separating zone vapors therein resulting from steps 7 and 8, and (10) withdrawing latex from said separating zone, and this process is improved by combining in the process the further steps of: (11) cooling and condensing the vapors withdrawn in step (9) to form a mixture comprising (a) said solvent in liquid form and (b) water containing said solvent; (12) effecting separation of the liquid solvent (a) from said solvent-containing water (b); (13) vaporizing a quantity of said solvent-containing water (b) sufficient to form at least a substantial part of the flow of gas comprising steam required by step (5); and (14) providing the flow of gas in step (5) at least in substantial part from the flow of gas formed in step (13).

In a particular species of said first embodiment step (13) thereof is effected in a vaporizer in which there may accumulate any of said macromolecular substance which may be entrained in the vapors withdrawn in step (9), and the improvement further comprises the cooperating steps of (15) isolating said vaporizer from the process from time to time, and (16) removing from said isolated vaporizer any macromolecular substance accumulated therein by circulating therethrough liquid solvent separated in step (12).

In a preferred species of said first embodiment step (13) is effected selectively in one of two vaporizers in which there may accumulate any of said macromolecular substance and emulsifier that may be entrained in the vapors withdrawn in step (9) and the improvement further comprises the steps of (15) from time to time using alternately the respective ones of said vaporizers in step (13) while isolating from the process the vaporizer not being so used, and (16) circulating through the isolated vaporizer liquid solvent separated in step (12) for removing therefrom any macromolecular substance accumulated therein.

In yet another species of the first embodiment the latex withdrawn in step (10) is concentrated by vaporization of water therefrom, and the so vaporized water is at least in part condensed and combined with the solvent-containing water (b) separated in step (12).

In a second embodiment of the invention steps (1) to (6) and (9) to (14) may be the same as in the first embodiment and steps (7) and (8) may involve only (7) establishing a separating zone maintained at said lower pressure and (8) introducing into said separating zone the latex droplets and vapors produced by step (6), and in this embodiment also the cooperating steps (15) or (15) (16) referred to above may be respectively incorporated to obtain the advantages thereof.

Thus, objects of the invention, severally and interdependently, are to provide new apparatus features and new combinations of steps, which contribute to produce an improved process. Other objects an advantages of the invention will be apparent from the above general description and the following more particular descriptions of preferred embodiments thereof, which, however, are illustrative but not restrictive of the invention, the scope of which is more particularly pointed out in the appended claims.

By the term "latex" as used herein is meant an aqueous suspension of essentially colloidal polymer, i. e. macromolecular and/or low molecular weight particles and emulsifier material and the polymer components thereof may be selected from the following types and combinations thereof:
  i. homopolymer,
  ii. interpolymer including block and graft polymer,
  iii. hydrocarbon polymer,
  iv. polar polymer,
  v. polymer composition comprising polymer material selected from (i) through (iv) above and compounding ingredients including resins, synthetic resins and reinforcing fillers and/or non-reinforcing fillers.

By the term "colloidal particle" or "colloid" as used herein is meant particles in the size range of 500 A to 10,000 A diameter, and by the term upper portion of the colloidal size range is meant particles in the size range of above 2,000 A, preferably 3,000 to 5,000 A, diameter.

By the term "precursor latex particle size" is meant a particle of polymer composition and solvent of such a size that when relieved of its solvent content the resulting particle is a colloidal particle as above defined.

By the term "greater than precursor latex particle size" is meant a particle of polymer composition and solvent which when relieved of its solvent yields particles of greater than colloidal size, which reduce the mechanical stability of the latex. Such particles are usually from 10 to 1,000 times as large as particles of precursor latex particle size.

By the term "resin" as used herein is meant natural or synthetic resin those inflammable amorphous vegetable products of secretion or disintegration usually formed in special cavities of plants and such resins are generally insoluble in water and soluble in alcohol, fusible and of conchoidal fracture and are usually oxidation or polymerization products of terpenes.

By the term "synthetic resin" as used herein is meant organic oxidation, polymerization or condensation products not produced in nature but produced synthetically and having resin-like properties and which term does not include the synthetic rubbers. Synthetic resins include (1) the resinous polymers produced from unsaturated petroleum compounds by oxidation and/or polymerization such as resinous alpha-olefin polymers, (2) condensation resins such as the phenolic resins, the aminoplast resins, alkyd resins, glycerol-phthalate resins and the like; (3) the non-rubber-like resinous polymers produced by cyclizing, hydrogenating or halogenating unsaturated rubber-polymers such as cyclized polyisoprene, chlorinated polyisoprene and the like, (4) resins derived from coal tar chemicals such as the cumarone-indene resins; (5) resinous materials prepared from vinyl, vinylidene and vinylene monomers; (6) resinous copolymers prepared from vinyl, vinylidene and vinylene monomers with conjugated diene monomers such as the high styrene-butadiene resins; (7) resinous copolymers prepared from vinyl, vinylidene, and vinylene monomers and alpha-olifins such as the ethylene-vinyl acetate copolymers. As used herein the terms "synthetic resins" is restricted to those synthetic resins which are soluble in at least one solvent essentially water immiscible and which itself or as its azeotrope with water has a boiling point lower than that of water at atmospheric pressure.

By the term "water-immiscible solvent" as used herein is meant an organic solvent or solvent mixture which is essentially immiscible with water in liquid phase, and which (a) has a boiling point less than the boiling point of water at atmospheric pressure, or which (b) forms an azeotrope with water which has a boiling point less than the boiling point of water at atmospheric pressure. Such water immiscible solvents include, but are not limited to, aliphatic, alicyclic, and aromatic hydrocarbon solvents, especially those containing from 4 to 9 carbon atoms; the halo-carbon and halo-hydrocarbon solvents; and suitable polar solvents, especially those containing oxygen. Examples of such solvents, all of which are of the class of physical solvents, are butane, pentane, hexane, cyclohexane, heptane, benzene, toluene, the xylenes, ethyl benzene, cumene, carbon tetrachloride, trichlorethylene, certain freons, and the like.

THE POLYMER MATERIAL (1)

The new process is applicable to the preparation of latices from solvent solutions or dispersions of polymer materials which are essentially solvent soluble or dispersible and essentially water insoluble, including natural rubber and polymers of ethylenically unsaturated monomer material containing from 2 to 20 carbon atoms, preferably from 2 to 10 carbon atoms. It is especially applicable to those elastomers and plastomers which, with or without plasticizer, have the foregoing properties and properties adapting their latices for use as adhesives, binders, film forming materials, coating materials, etc. Examples of such elastomers and plastomers, illustrative but not restrictive of those to which the invention can be applied, are as follows: butyl rubber, chlorinated butyl rubber, polyisobutylene, polybutadiene, polyisoprene, polyethylene, polypropylene (including both amorphous and/or crystalline polypropylene), ethylene-propylene polymer, ethylene-propylene-diene terpolymer, ethylene-vinylidene monomer interpolymers (including ethylene-vinyl acetate copolymers), butadiene-ethylene copolymers, propylene-butene-1 copolymers, butadiene-styrene copolymer, nitrile rubber (including butadiene-acrylonitrile and butadiene-methacrylonitrile copolymers), natural rubber, hydrocarbon resins, any of the foregoing polymers grafted with polar or other polymer grafts, as for example, those set forth in British Pat. No. 878,150 to Burke, published Sept. 27, 1961, and solvent soluble mixed plastomers and elastomers, e. g. butadiene-styrene-terpolymers with styrene copolymer resins including graft polymers thereof, as for example, those set forth in Hayes U.S. Pat. No. 2,802,808. Particularly included are those polymers which are prepared in essentially water immiscible orgaic liquid, or under essentially anhydrous conditions, from unsaturated monomers having 2 to 20 carbon atoms.

COMPOUNDING INGREDIENTS (3) (3A)

The compounding ingredients which are especially contemplated in the present invention are the solid, particulate, compounding ingredients which are insoluble in the solvents (6), namely: fillers, including rubber reinforcing fillers, pigments, etc., which by the present invention may be incorporated into the polymer composition particles of the latices, rather than merely in the water phases thereof. The solid particulate compounding ingredients of this class comprise those set forth on pages 278 to 345of "Compounding Ingredients for Rubber" 3rd Edition (1961) published by Rubber World, New York, N.Y., herein incorporated by reference, and on pages 146 to 217 of "British Compounding Ingredients for Rubber" by Brian J. Wilson (1958) published by W. Heffer and Sons, Ltd., Cambridge, England, herein incorporated by reference. These ingredients thus include but are not limited to carbon black, talc, mica, lithopone, aluminum silicate, calcium silicate, silica, calcium carbonate, calcium sulfate, asbestos, organic pigments, inorganic pigments, and insoluble organic fillers including vinylic fillers and vinylic pigments. The insoluble organic fillers are described in British Patent No. 799,043 to Burke published July 30, 1958 and in chapter 15 entitled "Reinforcement of Rubber by Organic Fillers" in the treatise "Reinforcement of Elastomers" edited by Gerard Kraus (1965) published by International Publishers, New York, N.Y., herein incorporated by reference.

D. THE EMULSIFIERS (8)

The invention in its broader aspects is not dependent on the use of any particular emulsifier or combination of emulsifiers, and may be practiced with any selected emulsifier or emulsifier combination suitable for aqueously emulsifying the non-aqueous solvent solutions or dispersions of the polymer materials concerned, and/or for stabilizing the latices derived therefrom in the aerosol generator, or for subsequent treatment or conditioning, for which purpose the emulsifier or combination of emulsifiers must be water soluble or water dispersible. Emulsifiers capable of forming stable aqueous emulsions with polymers may be selected from the following sub-groups:

a. One or more anionic emulsifiers.
b. One or more cationic emulsifiers.
c. One or more nonionic emulsifiers.
d. Combinations of anionic and nonionic emulsifiers.
e. Combinations of cationic and nonionic emulsifiers.

The anionic, cationic and nonionic emulsifiers which are water soluble usually contain from 8 to 22 carbon atoms, when non-polymeric, but such limitation does not apply to those which are polymeric, where water solubility or dispersability is the criterion. The polymeric emulsifiers are best employed in conjunction with non-polymeric emulsifiers.

Emulsifiers of the anionic, cationic, and nonionic types including in some instances those in polymeric forms are set forth in "Detergents and Emulsifiers 1973 Annual" by John W. McCutcheon, published by John W. McCutcheon, Inc., Morristown, N.J., and especially those listed therein under the headings of emulsifiers suitable for emulsion polymerization or suitable for the emulsification of polymer material, or suitable for the emulsification of hydrocarbons including hydrocarbon waxes, may be used in practicing the present invention. The use of about 5–20 percent by weight of emulsifier material based on the polymer composition content of the polymer-solvent cement in practically all instances suffices, and in most instances 5 to 6 or less percent by weight of emulsifier based on polymer composition content of the cement is sufficient, because the present process minimizes the amount of emulsifier required.

The anionic emulsifiers include but are not limited to emulsifiers which are alkali metal salts of fatty acids, partially hydrogenated fatty acids, rosin acids, disproportionated rosin acids, alkyl sulfates, aryl and alkaryl sulfonates, and water soluble and dispersable emulsifiers having the general formula: $R(OCH_2CH_2)_nOSO_3X$ wherein R is an aliphatic, aryl, alkaryl or cyclic radical, $n$ is 1 to 9, and X is a monovalent alkali metal or ammonium radical.

Typical anionic emulsifiers are set forth in Table A.

TABLE A

Typical Anionic Emulsifiers

| | Salt | Acid or Acid Radical | Trade Name |
|---|---|---|---|
| 1. | Potassium | hydroabietic and dehydroabietic | Dresinate 731 |
| 2. | Potassium | disproportionated tall oil rosin | Indusoil JC-11B |
| 3. | Sodium | hydrogenated tallow fatty acids | Armeen HT |
| 4. | Sodium | lauryl sulfate | Sipex UB Dupanol WAQ |
| 5. | Sodium | tallow sulfate | Conco Sulfate T |
| 6. | Ammonium | mononaphthalene sulfonic acid | Lomar PWA |

TABLE A-continued
Typical Anionic Emulsifiers

| | Salt | Acid or Acid Radical | Trade Name |
|---|---|---|---|
| 7. | Sodium | dodecylbenzene sulfate | Santomerse 85B |
| 8. | Sodium | polymerized alkyl naphthalene sulfonic acid | Daxad 15 Daxad 23 |
| 9. | Sodium | alkyl aryl sulfonate | Nacconol 90F Suframin OBS |
| 10. | Sodium | alkylnaphthalene sulfonate | Nekal BA-75 |
| 11. | Sodium | N-cyclohexyl-N-palmitoyl-taurate | Igepon CN-42 |
| 12. | Sodium | lauryl ether sulfate | Sipon ES |
| 13. | Sodium | alkylaryl polyether sulfate | Triton W-30 |
| 14. | Sodium | sulfate ester of nonylphenoxypoly (ethyleneoxy) ethanol | Alipal CO-433 |
| 15. | Ammonium | sulfate ester of nonylphenoxypoly (ethyleneoxy) ethanol | Alipal CO-436 |
| 16. | Sodium | naphthalene sulfonic acid | Nacconol NRSF |
| 17. | Sodium | dioctyl ester of sulfosuccinic acid | Aerosol OT |
| 18. | Sodium | saponified poly(methylvinylether/ maleic anhydride) | Gantex AN-139 |
| 19. | Sodium | saponified poly-(styrene/maleic anhydride) | Lytron SMA-3000A |

The cationic emulsifiers include, but are not limited to, the class of emulsifiers which are acid salts of primary, secondary, and tertiary amines and the quaternary ammonium type emulsifiers. Typical cationic emulsifiers (used with acids to form water soluble salts when not quaternary ammonium compounds) are set forth in Table B.

TABLE B
Typical Cationic Emulsifiers

| | Emulsifier Base | Trade Name |
|---|---|---|
| 1. | Cocoamine | Armeen C |
| 2. | Stearylamine | Armeen T |
| 3. | N-alkyl trimethylene diamines (alkyl groups derived from cocoanut, soya, and tallow fatty acids) | Duomeen C Duomeen T |
| 4. | Primary fatty amine ethylene oxide reaction products, e.g. $RNH(CH_2CH_2O)_{25}H$ | Priminox T-25 |
| 5. | Polyoxyethylated alkylamine | Katapol PN-430 |
| 6. | Ethylene oxide condensates with primary fatty amines | Ethomeens |
| 7. | bis(2-hydroxyethyl)cocoamine oxide | Armox C/12W |
| 8. | bis(2-hydroxyethyl)tallow amine oxide | Armox T/12 |
| 9. | Amine and quaternary ammonium compounds suitable as asphalt emulsifiers | Redicote Series e.g. Redicote E-4, E-5, E-9, E-12 and E-N. |
| 10. | $C_{18}H_{37}N(CH_3)_2ClC_3H_6N(CH_3)_3Cl$ | Redicote E-11 |
| 11. | di-isobutyl phenoxy ethoxy ethyl dimethyl ammonium chloride | Hyamine 1622 |
| 12. | N-alkyl trimethylammonium chloride (alkyl = coco or steryl radical) | Arquads |
| 13. | polyvinylpyrrolidone | PVP |

Non-ionic emulsifiers can be selected from the class of emulsifiers which are alkyl polyoxyethylene ethers and alcohols, or polyethylene ethers and alcohols. Other non-ionic emulsifiers include those which are polyoxyalkenated alkyl phenols or alcohols having the formula $R(OCHR_1CHR_1)_nOH$ where R is an alkyl, aryl or alkaryl group, $R_1$ is an alkyl group or hydrogen and n is an integer of 4 to 10 or even higher. Compounds of this type are prepared by condensing an alkyl phenol or an alcohol with ethylene oxide or propylene oxide. Typical nonionic emulsifiers are set forth in Table C.

TABLE C
Typical nonionic Emulsifiers

| | Chemical Name | Trade Name |
|---|---|---|
| 1. | Nonylphenoxypoly(ethyleneoxy)-ethanol | Igepal CO-970 |
| 2. | nonylphenyl polyethylene glycol ether | Tergitol TP-9 |
| 3. | polyethyleneglycol fatty ester | Modecol L. |
| 4. | coconut alkanolamide | Monamine AA-100 |
| 5. | polyethyleneglycol 400 monolaurate | Pegmol-5942 |
| 6. | propyleneglycol monolaurate | — |
| 7. | castordiethanolamide | Emid-6547 |
| 8. | ethylene oxide condensate with primary fatty amides | Ethomids |
| 9. | fatty alcohol polyglycolether | Lorox |
| 10. | sorbitolsesquioleate | Nonion OP-83 |
| 11. | polyoxyethylene lauryl ether | Brij-35 |
| 12. | polyoxyethylene lauryl alcohol | Igepal-430 |
| 13. | polyetherated fatty alcohols | Emulphor-CN Emulphor-CN-870 |
| 14. | polyoxyethylated octyl phenol having 8 to 10 ethylene oxide units | Triton X-100 |

The Polymeric Emulsifiers include the water dispersible polyelectrolytes set forth in Hedrick and Mowry's U.S. Pat. No. 2,625,529 relating to "Methods of Conditioning Soils." In said patent are listed a number of water-soluble polyelectrolytes and these materials are defined as "synthetic water soluble polyelectrolytes having a weight average molecular weight of at least 10,000 and having a structure derived by the polymerization of at least one monoolefinic compound through the aliphatic unsaturated group and substantially free of cross-linking." The present invention has shown that these synthetic water soluble polyelectrolytes can be employed as emulsifiers for the preparation of latices as herein set forth. The disclosed polyelectrolytes of this patent are therefor incorporated herein by reference, it being noted however that the lower limit of molecular weight prescribed by the patentee does not apply, the applicable criterion being that the materials are water soluble or water dispersible emulsifiers.

Combinations of emulsifiers. The present invention has disclosed that by using certain combinations of emulsifiers, it becomes possible to prepare a stable latex from aliphatic hydrocarbon polymers dissolved in hydrocarbon solvents and even in aromatic solvents, as is desirable under certain processing conditions. An effective emulsifier combination for aqueously emulsifying 100 parts by weight of a hydrocarbon rubber dissolved in from about 300 to 600 parts of an aromatic hydrocarbon solvent such as toluene, may comprise 10 parts by weight of a nonionic emulsifier, e.g. polyoxyethylated octyl phenol such as Triton X-100, a trade mark product and one part by weight of an anionic emulsifier, e.g. sodium lauryl sulfate.

Another effective emulsifier combination for 100 parts by weight of hydrocarbon rubber dissolved in about 400 parts of aromatic solvent such as toluene combines 3 parts by weight of the aryl anionic emulsifier, sodium salt of an alkaryl polyether sulfate e.g. Triton W-30 (a trade mark product) and 3 parts by weight of the non-aryl anionic emulsifier sodium lauryl sulfate, e.g. Dupanol WAQ (a trade mark product).

It has for some time been a desideratum in the art to have a stable hydrocarbon rubber latex suitable for combination with asphalt or asphalt emulsions, for road surfacing and roofing purposes, for example. Application Ser. No. 691,823 has disclosed that latices of hydrocarbon rubber such as butyl rubber, polyisobutylene, ethylene-propylene rubber or rubbery amorphous polypropylene, which are suitable for such use, can be prepared by employing as emulsifier for the hydrocarbon solvent solution of the rubber a combination of emulsifiers in which one or more quaternary ammonium emulsifiers (e.g. the quaternary ammonium compounds supplied under the Redicote trade mark), are combined with one or more fatty acid amine or diamine type emulsifiers in the ratio of quaternary ammonium to fatty acid amine in the range of from 1:5 to 5:1, notwithstanding that the quaternary ammonium emulsifiers alone, for the most part, will not form stable aqueous emulsions with the above types of hydrocarbon polymers.

For example a stable aqueous latex is obtained from hydrocarbon rubber e.g. butyl rubber or ethylenepropylene rubber, dissolved in an aliphatic or even an aromatic solvent, e.g. hexane, benzene, toluene and/or the zylenes, with the aid of a mixture of the emulsifiers selected from subgroups (a) and (b) in the ratio of 0.5:5 to 5:0.5 parts by weight, said mixture being employed in the amount of 2 to 10 parts by weight based on the polymer, and said sub-groups (a) and (b) being represented by formulae I and II respectively:

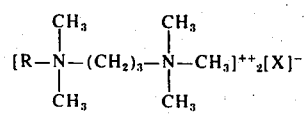

I.

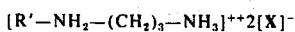

II.

wherein R and R' are selected from the alkyl radicals having from 8 to 22 carbon atoms and X is an acid anion, preferably the alkyl radicals being those derived from cocoanut oil and/or tallow fatty acids.

The quantity of emulsifier employed in this invention is in the range of 2% to 20% by weight and preferably 4% to 12% by weight based on the high polymer composition; and if desired, small additions of electrolyte may be made to the latex or in preparing the course or fine emulsion, as, for example, in accordance with the practices referred to in U.S. Pat. Nos. 2,955,094 issued Oct. 4, 1960 and 3,222,311, issued Dec. 4, 1965, to Esso Research and Engineering Company, as assignee of R. S. Brodkey et al, and A. L. Miller et al. Alkali metal acid phosphate salts are suitable for this purpose, and are also useful in connection with the use of the addituent 24d (FIG. 1) as above described, for reducing the quantity of said addituent required.

MONOMER MATERIALS (24b)

The ethylenically unsaturated monomer material employable herein is selected from the class consisting of:
i. the mono-ethylenically unsaturated aromatic hydrocarbon monomers containing from 8 to 18 carbon atoms,
ii. the conjugated diene hydrocarbon monomers containing not more than 12 carbon atoms,
iii. the non-conjugated diene hydrocarbon monomers containing not more than 18 carbon atoms,
iv. the mono-ethylenically unsaturated monomers containing polar groups and having not more than 18 carbon atoms, and
v. the non-conjugated diene and triene monomers containing polar groups and having not more than 22 carbon atoms, the polar groups of (iv) and (v) being selected from the class consisting of carboxyl, hydroxyl, carbonyl, ester, ether, nitrile, amine, quaternary ammonium, amide, triazine, halogen, and sulfur or phosphorous containing groups.

Examples of the respective groups of monomers comprised in the above class are set forth in my aforesaid applications, particularly application Ser. No. 784,596, filed Dec. 18, 1968, and are herein incorporated by reference.

FREE-RADICAL GENERATING POLYMERIZATION CATALYSTS (24a)

The free-radical generating catalysts and catalyst systems useful in the range of 0.8 to 20 parts per 100 parts of added monomer materials employed in certain embodiments of the present invention constitute a well-known class which includes: the inorganic peroxides such as hydrogen peroxide and the like; the various organic peroxy catalysts, such as the dialkyl peroxides, e.g. diethyl peroxide, diisopropyl peroxide, dilauryl peroxide, dioleyl peroxide, distearyl peroxide, di-(tertiary-butyl) peroxide; di-(tertiary amyl) peroxide, dicumyl peroxide and the like; the alkyl hydrogen peroxides such as tertiary butyl hydroperoxide, tertiary amyl hydroperoxide, cumene hydroperoxide, tetralin hydroperoxide, and diisopropyl benzene hydroperoxide and the like; the symmetrical diacyl peroxides, for instance acetyl peroxide, propionyl peroxide, lauroyl peroxide, stearoyl peroxide, malonyl peroxide, succinoyl peroxide, phthaloyl peroxide, benzoyl peroxide; ketone peroxide such as methylethyl ketone peroxide, cyclohexanone peroxide, and the like; the fatty oil acid peroxides, such as cocoanut oil acid peroxides and the like; the unsymmetrical or mixed diacyl peroxides, such as acetyl benzoyl peroxide, propionyl benzoyl peroxide and the like; the azo compounds such as 2-azobis (isobutyronitrile), 2-azobis (2-methylbutyronitrile), 1-azobis (1-cyclohexancarbonitrile) and the like, and other free radical generating catalysts employable in emulsion polymerization, such as peroxy-catalyst compounds in combination with a reducing compound such as an amine, e.g. triethylene tetramine or tetraethylene pentamine, with or without metallic ion combination, e.g., ferrous ions, which systems are referred to as "redox" free-radical generating catalyst systems, which latter are further exemplified in the treatise "Emulsion Polymerization" by F. A. Bovey, et al, 1955 Interscience Publishers, Inc., New York, N.Y. at pages 71–93, herein incorporated by reference.

CROSS-LINKING AGENTS (24c)

The cross-linking agents useful, in the range of 0.1 to 20 parts per 100 parts of polymer content of the latex by weight, for effecting the cross-linking employed in particular embodiments of the present invention, also form a well-known class of materials which includes: elemental sulfur, selenium and tellurium, and compounds containing these elements, usually in their lower valence states or covalance states, and other polyfunctional free radical generating catalysts. Compounds which liberate sulfur, selenium or tellurium during irradiation or during heat aging (100° to 200° C.) are useful. Polymers containing sulfur, selenium or tellurium and/or monomers capable of forming such polymers are also useful. Conventional rubber vulcanizing agents and vulcanizing accelerators are particularly adapted to this application. Specific compounds of the class are: The mercapto thiazoles, such as 2-mercaptobenzothiozole and its salts, for example its zinc salt, thiuram sulfides, such as tetraethylthiuram monosulfide and tetrabutylthiuram monosulfide; guanidines, thiourea, substituted thioureas, thiocarbanilides, substituted thiocarbanilides such as o-dimethylthiocarbanilide and its isomers and alkyl homologs; zinc dialkyl dithiocarbamates such as zinc dimethyl dithiocarbamate, zinc diethyldithiocarbamate, zinc dibutyl dithiocarbamate, and zinc dibenzyl dithiocarbamate or accelerators containing these materials, thiurams such as tetramethylthiuram disulfide, tetraethylthiuram disulfide, and other tetra substituted thiuram disulfides; selenium dialkyl dithiocarbamates such as selenium diethyldithiocarbamate; 2-benzothiazyl-N,N-diethyl-thiocarbamyl sulfide; sodium or potassium dimethyldithiocarbamate; xanthates such as dibutyl zanthogen disulfide and Naugatuck Chemical's CPB and ZBX; alkyl phenol sulfides; bis(dimethylthiocarbamyl) disulfide, dipentamethylene tetrasulfide; and sulfur containing polymers such as Thiokol VA-3, 4,4-dithiomorpholine and disulfides such as benzothiazyl disulfide. In fact, any compound in which sulfur, selenium or tellurium is attached only to an atom of carbon, hydrogen, nitrogen or to another sulfur, selenium or tellurium atom, as the case may be, may be suitable.

Also included in the class are the sulfonyl hydrazides and disulfonyl hydrazides. The latter are particularly useful since they contain two widely separated sulfur-bearing moieties capable of forming sulfur cross-links or free radical derived cross-linkages (as a result of thermal loss of nitrogen). Blowing agents such as p,p'-oxybis (benzene sulfonyl hydride), p,p'-diphenyl bis(-sulfonyl hydrazide) and m-benzene-bis(sulfonyl hydrazide) are examples of additives which can also be employed as cross-linking agents.

Included in the class are the cross-linking azo compounds, e.g. di-cyano-azo-butane; and the like.

Included in the class are also the peroxy compounds such as bis($\alpha$-, $\alpha$-dimethyl-dicumy) peroxide (dicumyl peroxide), 1,3-bis($\alpha$-, t.butylperoxypropyl) benzene, 2,5-bis(t.butylperoxy)-2,5-dimethylhexane, 2,5-dimethyl-2,5--di(t.butylperoxy)hexyne-3, di($\alpha$-, $\alpha$-dimethyl-p-chlorobenzyl)peroxide, di($\alpha$-,$\alpha$-dimethyl-2,4-dichlorobenzyl) peroxide, di($\alpha$-, $\alpha$-dimethyl-naphthyl)peroxide and the like.

Further included in the class are combinations of the above said peroxy compounds and the above said sulfur, selenium and tellurium compounds.

BRIEF DESCRIPTION OF THE DRAWING

In the accompanying drawings:

FIG. 1 being a flow sheet or diagram illustrating the sequences of steps and flow of material in the process which incorporates the typical embodiments of process set forth in FIG. 3; FIG. 2 being a diagram of a preferred form of equipment for preparing the latex in which is incorporated the embodiments of the process set forth in FIG. 3; and FIG. 3 being a flow sheet and diagram setting forth the specific process improvements and apparatus features of this invention.

Figure 1:
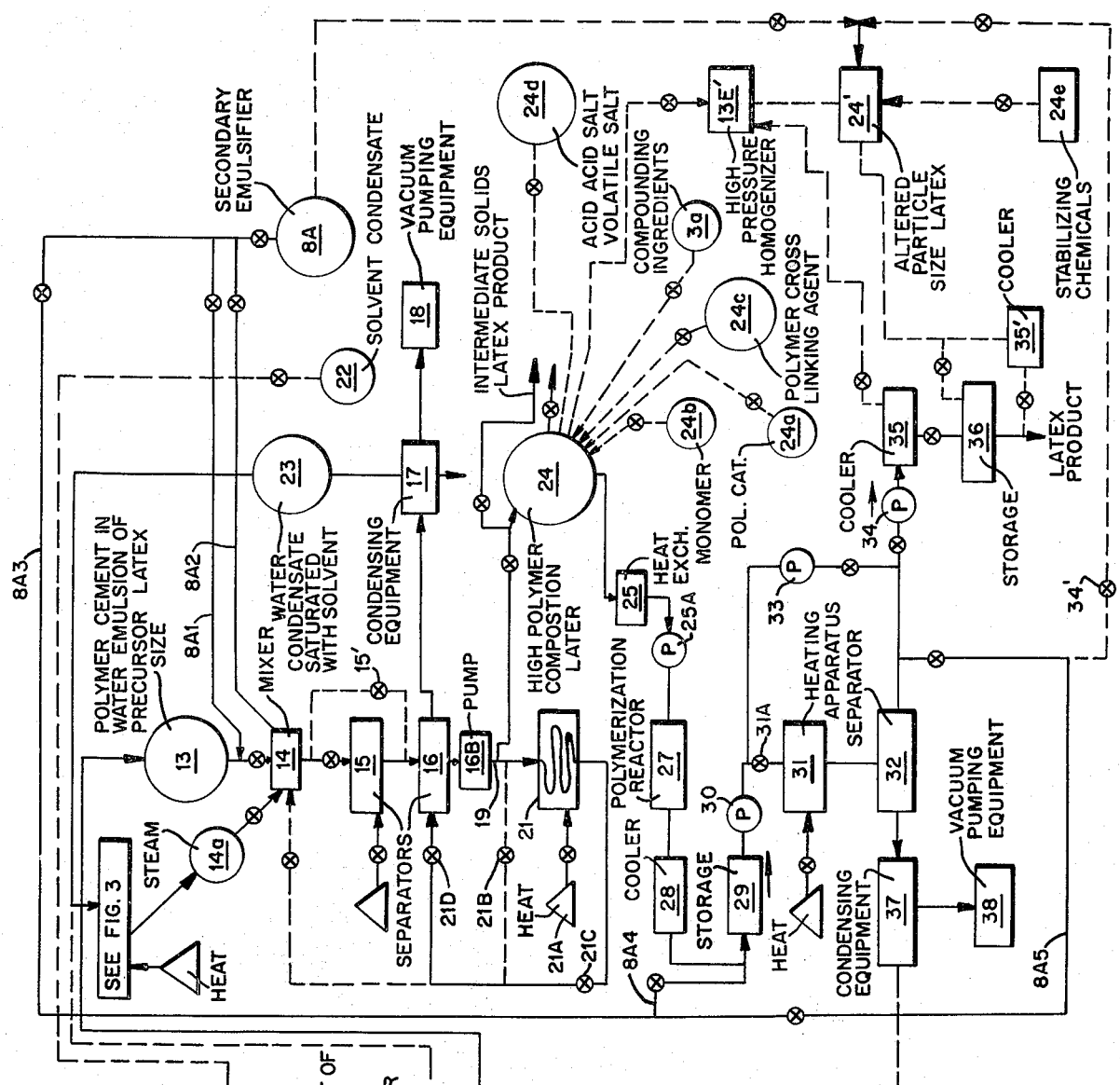
FIG. 1 to 3 are respectively flow sheets or diagrams of the process embracing the present improvements and the process steps and apparatus features which cooperate with said specific improvements and to the embodiment thereof in a complete process and apparatus for producing latex from an emulsion of solvent polymer cement.
Figure 2:
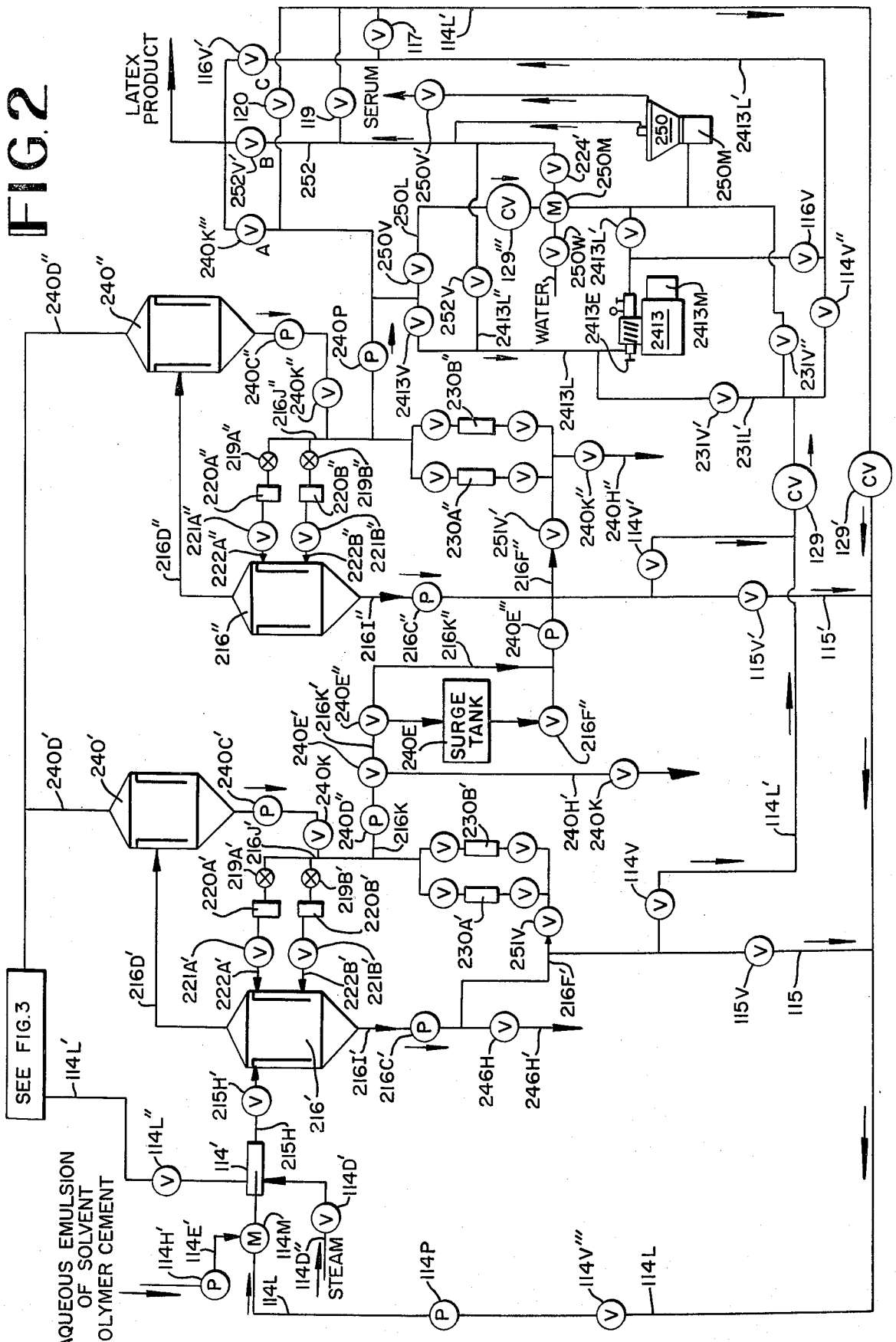
Figure 3:
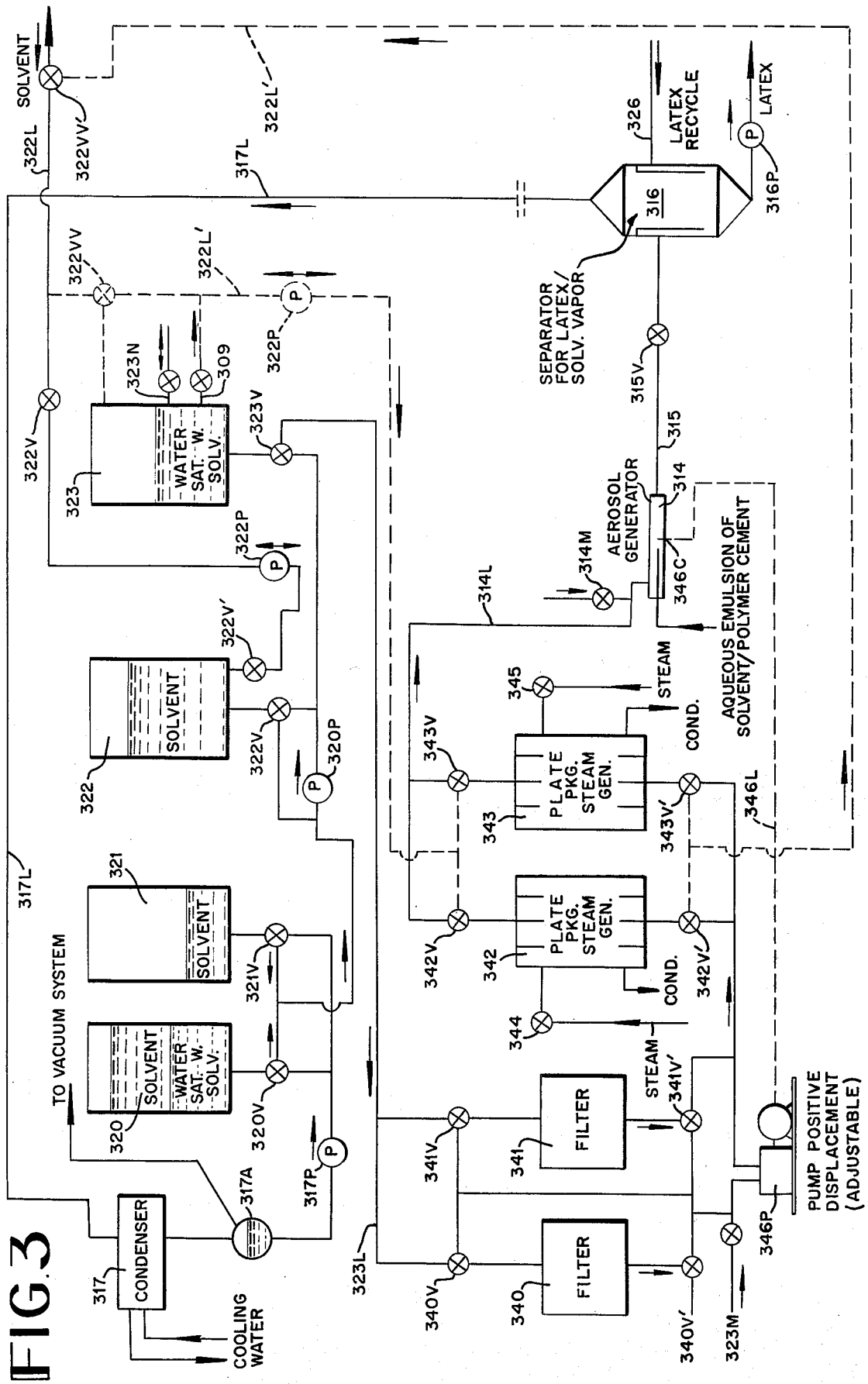

DESCRIPTION OF PREFERRED EMBODIMENTS a. In General:

The particular improvements hereinafter described in connection with FIG. 3 are applied to overall processes and apparatus for producing latices, as illustrated in FIGS. 1 and 2, and are particularly cooperative with preferred embodiments thereof.

In such preferred embodiments as illustrated in FIG. 1, the high polymer 1, e.g. elastomer and/or plastomer material and/or resins or resinous material with or without compounding ingredients as hereinafter described, is prepared as a high polymer composition 4 for conversion to a cement, as by working in appropriate masticating, comminuting, or attenuating equipment 2 such as a rubber mill, Banbury comminutor, extruder, or the like. In accordance with the aforesaid applications provision may be made for incorporating one or more known polymer compounding ingredients 3, e.g. rubber reinforcing filler, into the said polymer composition in such a way that the ingredients 3 are thereafter contained within the polymer particles of the latex being formed, for which purpose the said ingredient or ingredients 3 may be worked into the high polymer 1 by working therewith in the masticating equipment 2. By such procedure the said polymer ingredients may become fixed to the compounding ingredient, i.e. the polymer particles can become reinforced by the fillers, and in effect become so intimately attached thereto, or embrasive thereof, as to retain the same when dispersed as a cement. In the case of compounding ingredients desired to be incorporated in the latex particles, but not requiring working with the polymer itself, such ingredients 3 may be fed into the cement forming equipment or dissolver 5 independently of the said polymer composition 4, as is also indicated in FIG. 1.

In the cement forming equipment or mixer of dissolver 5 which may also comprise a disperser, the high polymer composition 4 is combined and preferably stirred or otherwise worked with solvent 6 appropriate for the high polymer and for the process, as further described herein, to form a solvent cement 7 of the high polymer composition 4 and of any extraneously added compounding ingredients 3; the adequate dispersion of which in the cement may require virorous working, which may even be accomplished by the passage of the cement through a suitable dispersing equipment 7a.

The solvent/polymer cement 7 is then combined with emulsifier 8 appropriate for the high polymer and the process, and with water 9 in a coarse emulsion mixing equipment 10 where the ingredients are mixed, preferably with the aid of heat, to form a coarse cement in water emulsion 11, which is then passed one or more times through an ultradispersing equipment 12, which breaks up the relatively large particles of solvent-cement forming the discontinuous phase in the coarse emulsion 11 into particles principally of precursor latex size, i.e. which will be of latex particle size when relieved of their solvent content, and preferably in the upper portion of the colloidal size range.

As in my aforesaid applications the coarse cement-in-water- emulsion 11 may be passed one or more times, usually 6 to 12 times, through one or more so-called ultradispersers 12 e.g. of the "Moulds" or "Hager" type described in U.S. Pat. No. 3,195,867 and in U.S. Pat. No. 3,194,540, in order to accomplish a sufficient reduction of latex particle size. The resulting fine emulsions have rather wide ranges of cement droplet size distribution and, adjusted if necessary to an appropriate temperature, as by the cooler 13A, by-pass 13B and/or heater 13C, may be fed by suitable positive displacement, e.g. plunger, pump means 13D, to a homogenizer (13E), preferably of the vibrating blade type e.g. the Rapisonic (trademark) liquid whistle operating at 300 to 500 p.s.i. inlet and 30 to 50 p.s.i. outlet or of the resiliently restricted orifice type high pressure homogenizer operating at pressures in the range of 1,000 to 10,000 p.s.i., e.g. the "Gaulin" type, see U.S. Pat. No. 753,792 and 756,953, for reducing the particle size distribution of the fine emulsion. The resulting emulsion 13 of reduced particle size distribution with or without cooling by a cooler 13F is preferably delivered directly to a steam mixer or aerosol generator 14 where it is dispersed into a flow of gas comprising steam. As indicated in FIG. 1 the emulsifier material 8 may be formed into an aqueous emulsifier solution 8' with water 9' saturated with solvent or with water 9" from an extraneous source.

The resulting fine cement-in-water emulsion 13, in accordance with my aforesaid applications may be an unstable emulsion of only temporarily precursor latex size particles, and may be either stabilized as by adding further emulsifier or may be immediately converted into an aerosol, of which the dispersed phase may comprise colloidal and larger sized droplets in a steam/solvent vapor continuum, thus minimizing agglomoration of polymer-solvent particles into greater than precursor latex particle size, and is therein stripped of its solvent content. In such aerosol form the stripping is accomplished without excessive foaming and while avoiding or minimizing formation of coagulum, desiderata which cannot be attained when any substantial proportion of solvent is attempted to be removed from an aqueous emulsion of high polymer solvent cement in other than an aerosol condition. As in the aforesaid applications, the formation of the aerosol is preferably accomplished by providing a flow of gas comprising steam 14a as an initial continuous phase and introducing the aqueous emulsion of at least temporarily precursor latex sized particles 13 as a discontinuous phase into the flow of steam as the initial continuous phase in a mixer or aerosol generator 14, whereby volatile solvent 6 is vaporized to become the continuous phase or the principal part thereof, and a corresponding amount of steam is condensed to supply the heat of vaporization for the solvent and become added as water to the discontinuous phse or to be used in accordance with this improvement for the supply of the gas comprising steam as set out in more detail hereinafter in connection with FIG. 3.

The final separation or collection may be achieved by delivering the flows from the segregator 15 into a separator or collector 16, from the lower part of which the latex is drawn, and from an upper part of which the continuous vapor phase is passed to condensing equipment 17 maintained under reduced pressure, preferably a vacuum of the order of 28 to 29 inches of mercury by withdrawal of uncondensed gases therefrom by vacuum pumping equipment 18. The gases are condensed in condenser 17 and the solvent with its dissolved water is separated and sent to storage 22 and recirculated to the process storage 6 while the solvent-containing water, which may be saturated with solvent, is sent to storage 23 and can provide at least a part of the water for the coarse emulsion mixer 10 through water storage 9.

Still referring to FIG. 1, the high polymer composition latex 19 withdrawn from the separator 16 may be in part delivered as product 24, and is recycled as indicated at 21, that is it may be cycled through a different or the same heater and separator (21 and 16) for concentrating the latex, in which event the latex is heated to evaporate water therefrom under sub-atmospheric pressure at temperatures within the limited temperature range for its stability and said evaporated water vapor is removed (as by lines 24OD' and/or line 24OD" FIG. 2) and continuing with FIG. 1, condensed and returned to water storage as at 23 and 9 and may be employed to prepare emulsion as at 10 and/or, in accordance with the present improvements, to provide the gas comprising steam at 14a as in more detail set forth in FIG. 3.

As in my U.S. application Ser. No. 784,596, various provisions may be employed for modifying the latex 24. These provisions are illustrated at 24 and following in FIG. 1 herein. Thus, in these embodiments of the process, the latex of intermediate solids content may be mixed in a hold tank, mixer, or proportionate feeder 24 with polymerization catalyst 24a and monomer material 24b, and after appropriate adjustment of its temperature, as by a heat exchanger means 25, may be passed to polymerization reactor means 27. The modified polymer latex delivered by the reactor with or without added emulsifier 8A may be delivered to storage 29, preferably through a cooler 28, pending delivery as by a pump 30 for further treatment in heating and separating apparatus 31 and 32. In this further treatment residual solvent, odors, and unreacted monomers, if any, may be removed, and if desired the latex may be further concentrated. The modified latex from separator 32 which in each event will have, along with other modifications, a higher solids content than the latex 24, may be passed by a pump 34 to product storage 36, preferably through a cooler 35.

In certain embodiments of the process, the operations up to point 24 may be conducted to form latex of low molecular weight polymer, which enables a latex of higher solids content to be employed without having to deal with excessively high viscosity, and monomer 24b and catalyst 24a, and temperature in the apparatus 27 may be employed in such quantities and degree as to materially augment the molecular weight of the polymer, and especially when it is desired to highly augment such molecular weight, polymer cross-linking agent 24c may be added in the mixer 24, for intimate association and reaction in the apparatus (27).

The final stripping, deodorizing, and/or concentrating in separator 32 is preferably effected as shown with the aid of condensing equipment 37 and vacuum pumping apparatus 38, and when such equipment produces a yield of recoverable fluid, e.g. water, such may be returned for reuse, e.g. to the water supply 23, or to water supply 9 as shown. Where prolonged shelf life is desired, additional emulsifier may be added to the latex from 8A, preferably ahead of the pump 34'.

FIG. 2 illustrates diagrammatically suitable apparatus to carry out the process to which the features of the inventions are applied. In this arrangement the separators 216', 216'', and 240'' may be of any suitable type. Separator 216' comprises a first tangential inlet for latex, solvent vapor and steam 215H, a flow restricting means or valve 215H' to regulate the back pressure, and second tangential inlet means 222A' and/or 222B' for flow of latex from heat exchangers (preferably plate heat exchangers) 220A' and 220B' with flow restricting means or valves; said streams of latex from recirculating and/or latex concentrating circuit as illustrated at 216I' to 221A' and 216I' to 221B'' and/or latex from any other source or latex of a different polymer composition than that carried by the stream 215H, when a mixture of latices is to be produced. In FIG. 2 the aqueous emulsion of precursor latex sized solvent/polymer material is delivered through pipe 114E' to stripper-mixer 114' together with steam supplied through valved line 114L' (generated from the aqueous phase condensate of vapor removed through lines 240D' and/or 240D'' is hereinafter set out in connection with FIG. 3.) with or without steam supplied through valved line 114D' and the resulting aerosol is conveyed through conduit section 215H with the pressure therein being regulated by the flow restricting means or valve 215H'. The aerosol of latex and solvent vapor, with or without excess steam, is delivered tangentially into separator 216' which operates at a lower pressure than the pressure within the mixer-stripper 114'.

Aqueous emulsion of solvent/polymer cement can be prepared with an emulsifier content which is not sufficient to permit stripping with the aid of steam without formation of an appreciable quantity of polymer coagulum; however, by blending the said emulsion with stripped latex from which solvent and water have been removed without substantial removal of emulsifier, the emulsifier content in the aqueous phase of the blend can be made sufficient to permit stripping without appreciable formation of coagulum. This provision of the present process is illustrated in one embodiment in FIG. 2, wherein pre-mixer 114M is supplied with an aqueous emulsion of solvent polymer cement through conduit 114E' and stripped polymer latex through conduit 114L, this stripped latex being recycled from a location downstream of the stripper 114' with the aid of pump 114P to pre-mixer 114M; the latex/emulsion blend flowing to mixer-stripper 114' and through conduit 215H and valve 215H' to separator 216'.

Pump 114P may draw the recycled latex from the separator 216' via line 115 and by opening valve 115V, but preferably draws more concentrated latex from a more downstream separator 216'' via line 115' by opening valve 115V' or via line 240H''' as by opening valve 120. Less desireably the pump 114P may draw latex of augmented particle size by opening valve 117, or even of reduced emulsifier content or both reduced emulsifier content and augmented particle size by opening valve 119.

In the form shown in FIG. 2 the skirt in separator 216' takes the form of a cylindrical wall generally concentric with and preferably in fairly closely spaced relation to the surrounding wall of the separator to define a relatively narrow annular space extending completely around the separator, closed at its top and open at its bottom, into which the flows of aerosol and latex are delivered to cause the aerosol droplets to impinge on the latex flowing helically, peripherally and downwardly inside the confining wall. In this arrangement a multiplicity of tangential inlets alternately for latex and for aerosol may readily be accommodated, it being understood that the latex will be delivered thereby so as to be impinged upon by the aerosol in any such arrangements or vice versa. The vapor outlet from the segregator-collector 216' delivers to the tangential inlet of a second collector 240', operated at a lower pressure than separator 216' and a non-condensing temperature for the solvent and its aqueous azeotrope, which entraps any minor quantity of latex droplets and/or foam that may be carried thereinto via 216D', and conduit 240D' carries away the gaseous vapors to the condensing system and recycling system set forth in FIG. 3. In FIG. 2 the latex separated in 216' with the aid of pump 216C' may in part be discharged through valve 246H, but preferably said latex is pumped via line 216F' alternately through filters 230A' and 230B' before further concentration or withdrawal. For partial concentration and for forming the flow of latex in 216', the filtered latex is delivered via conduit 216J' alternately or concurrently through heat exchangers 220A' and 220B' delivering tangentially into separator 216' via lines and valves 221A' and 221B', and when said valves are sufficiently open boiling takes place in the heat exchanger 220A' and 220B', however, the preferred embodiment is to partially close the valves until no boiling occurs in heat exchangers 220A' and 220B'.

To avoid flooding separator 216' an amount of latex equal to that entering the separator through line 125H must be removed, via conduit 246H' and/or conduit 216K. The partially concentrated latex removed via conduit 216K is pumped via pump 240D'' with the aid of three-way valves 240E' and 240E'' to surge tank 240E and therefrom to conduit 216F'' with the aid of pump 240E''' (or alternately, the surge tank may be bypassed via line 216K'' ) and thence through alternate filters 230 '' and 230B'' and through conduit 216J'' alternately or concurrently through heat exchangers 220A''; and 220B'' and tangentially into concentrator 216''. Valves 221A'' and 221B'' when sufficiently open permit heat exchangers 220A and 220B'' to be operated so that boiling takes place within the heat exchangers, however, in the preferred manner of operating the valves 221A'' and 221B'' are partially closed until no boiling of the aqueous phase of the latex occurs in heat exchangers 220A'' and 220B''. To inhibit carryover or entrainment of latex particles and/or foam to the vapor recovery system, separator 240'' is interposed between conduits 216D'' and 240D'' and this separator functions similarly to separator 240' which is interposed between conduits 216D' and 240D' and any carried over latex which is thrown down by separator 240'' is discharged from the bottom of the separator and pumped by pump 240C'' into recycle conduit 216J;; and in a like manner separator 240' discharges with the aid of pump 240C' into recycle conduit 216J'. The gaseous vapors from separators 216'' and 240'' are circulated via line 240D'' to the condensing and steam generating recycle system set forth in FIG. 3.

The partially concentrated and filtered latex product may be removed via conduit 240H' and/or product after final concentration may be removed through conduit 240H'' by opening valve 240K'' or after filtering through conduit 240H''' with the aid of pump 240P.

If it should be desired to alter the viscosity of all or part of the latex product, this may be accomplished by passing all or part of the latex delivered by pump 240P via valve 2413V to viscosity altering means between the valves 2413V, 250V, 231V and 116V.

In the form shown in FIG. 2, to provide altered particle size latex a supply of latex from pump 240P or from valve 231V is passed through line 2413L to the size altering means 2413. The latex product of altered particle size may be delivered through line 2413L' and Valves 116V and 116B' as latex product.

To provide latex of decreased emulsifier content, a supply of latex is passed through line 250L and flows through centrifuge 250 (e.g., DeLaval Model No. 244), a trademark product). In order to centrifuge the latex the dry solids content by weight of such latex must be reduced to the range of 20–40% by addition of water by opening valve 250W. The operation of the centrifuge is controlled by controlling serum take-off by adjusting valve 250V' and latex product valve 252V' to provide the latex product desired which may be delivered through line 252.

An alternate supply of lower solids latex from an earlier stage in the process with or without further water dilution, may be fed to the centrifuge via line 114L' by adjusting valves 114V, 114V' and 231V'. In a preferred operation the centrifuge is supplied with dilute latex, requiring little or no water addition, via valves 114V and 231V".

Latex of both reduced emulsifier content and increased particle size can be produced by opening valve 252V and permitting the centrifuged latex to flow through line 2413L" and 2413L to equipment 2413.

Alternatively latex from the so exemplified equipment may be supplied by line 2413L' and by controlling valve 231V is supplied to centrifuge 250 and the latex delivered through line 252.

The serum removed via valve 250V', principally water containing emulsifier, may be recycled to the water supplies 9 or 9' (FIG. 1) hereinabove described.

Further encompassed within the scope of the process described by FIG. 2 is the use of two or more centrifuges connected in series with serum removal and water addition between centrifugation steps. Alternatively the latex may be passed through the centrifuge two or more times with water dilution of the latex between the centrifugation steps via recycle valve 224' to mixer 250M' supplied with water from valve 250W.

Aqueous emulsion of solvent/polymer cement can be prepared with an emulsifier content which is not sufficient to permit stripping with the aid of steam without formation of an appreciable quantity of polymer coagulum; however, by blending the said emulsion with stripped latex from which solvent and water have been removed without substantial removal of emulsifier, the emulsifier content in the aqueous phase of the blend can be made sufficient to permit stripping without appreciable formation of coagulum. This provision of the present process is illustrated in FIG. 2, wherein premixer 114mo is supplied with an aqueous emulsion of solvent polymer cement through conduit 114E' and stripped polymer latex through conduit 114L, this stripped latex being recycled from a location downstream of the stripper 114' with the aid of pump 114P to pre-mixer 114M; the latex/emulsion blend flowing to mixer-stripper 114' and through conduit 215H and valve 215H' to separator 216".

Pump 114P may draw the recycled latex from the separator 216' via line 115 and by opening valve 115V, but preferably draws more concentrated latex from a more downstream separator 216" via line 115' by opening valve 115V' or via line 240H''' as by opening valve 120. Less desireably the pump 114P may draw latex of augmented particle size by opening valve 117, or even of reduced emulsifier content or both reduced emulsifier content and augmented particle size by opening valve 119.

The improvements of the present invention are illustrated in one embodiment in FIG. 3. The aqueous emulsion of solvent-polymer cement is conducted to the aerosol generator 314 and blended with sufficient steam supplied through conduit 314L with or without auxiliary steam supplied through valve 314M and said steam being in an amount to essentially evaporate all of the solvent from the emulsified polymer-solvent cement. The aerosol of latex particles in solvent vapor and water vapor is conducted through conduit 315 and through valve 315V to separator 316. In the separator the solvent vapor and water vapor therewith is separated from the latex particles. The latex particles are removed as liquid latex from the bottom of the separator with the aid of a conduit and pump 316P. The vapors leaving the separator comprise solvent vapor and water vapor and are conducted through conduit 317L. The water cooled and/or refrigerated condenser 317 or condensers condenses the solvent vapor to liquid solvent and the water vapor to liquid water which is then pumped alternately with the aid of pump 317P to settling tanks 320 and 321. When one of the tanks is filled with liquid then the solvent and water are permitted to separate while the alternate tank is being filled. By the use of three-way valves 320V and 321V and with the aid of pump 320P the solvent layer saturated with water in each settling tank is pumped to solvent storage tank 322 and the water layer saturated with solvent is pumped to water storage tank 323. The purpose of collecting the water saturated with solvent in tank 323 is to permit it to be vaporized and fed as gas comprising steam through conduit 314L to aerosol generator 314. Thus the water saturated with solvent by opening the three-way valve 323V and 340V passes through conduit 323L to a filter 340. When filter 340 needs to be cleaned then valve 340V is closed and valve 341V is opened and filter 341 is used to remove any latex coagulum or other residue which may be in the water saturated with solvent. Depending on the filter being used valve 340V′ or 341V″ is opened in order to feed the positive displacement pump 346P. This pump 346P pumps the water saturated with solvent to the steam generator 342 or 343 at rate controlled with the aid of a thermal probe 346C in aerosol generator 314 connected to the pump motor controller through electrical conduit means 346L. Three-way valves 342V′ and 343V′ permit the heat exchanger e.g., the plate packages to be used alternately. By adjusting valve 344 or 345 the steam to the multiple plate package heat exchanger 342 or 343 may be controlled so as to provide the desired quantity and temperature of the vapor comprising essentially steam required by the aerosol generator 314. The quantity of steam required to remove the solvent from the aqueous emulsion of solvent polymer cement may be controlled by the temperature probe 346C in the mixer 314 which is connected to pump 346P.

Should the water saturated with solvent in addition to any possible polymer coagulant contain any latex then this should separate out as coagulum in the plate package steam generator. When the plate package steam generators become fouled with polymer and are no longer efficient one or the other may be taken out of service by the use of three-way valve 342V or 343V and 342V' or 343V' which permits solvent to be circulated through these plate packages. Thus by opening valve 322V', 322V'' and closing 322VV' and with the aid of pumps 322P and 322P' the solvent can be conducted through conduit 322L' and 322L'' to either of plate packages 342 or 343 by opening valves 342V or 343V. With the aid of valve 342V' said solvent may be circulated through either plate package 342 or 343 by a conduit 322L'', 322L, and 322L' back to the plate packages 342 or 343 with the aid of pump 322P'. Thus by use of the solvent recovered from separator 316, the plate packages 342 and 343 can be kept clean and such plate packages can be used to generate the steam from the water saturated with solvent vapor which has been recovered from separator 316. If it is desireable to water wash plate package 342 and/or 343 the water saturated with solvent from tank 323 via line and valve 309 can be circulated via conduit 322L' and pump 322P to plate packages 342 and 343 and by conduit 322L'' and three-way valve 322VV returning to tank 323. Even fresh water may be injected into the cycle from line 323M with the aid of pump 346P or from line 323N. The improvement thus provides a means for complete re-cycle of solvent and water within the process, and greatly reduces the amount of water required to be supplied to the process, and can even eliminate discharge of waste water from the process and contamination of the environment thereby.

In effect, for vaporization of solvent saturated water, either steam generator 342 and 343 may be selectively connected to receive from pump 356P water and/or water containing solvent, to vaporize the same, and deliver therefrom gas comprising steam via line 314L. For solvent washing, either generator may be selectively connected in the loop circuit 322L', 322P', 322L'', 322L, and the said circuit may selectively be filled with either solvent from 322 via 322V''', or with solvent externally supplied via 322VV', and after soaking, with or without heating and/or circulation by operation of pump 322P' in either direction, the solvent may be pumped from the said circuit into tank 322 or out through 322VV', as desired. And for water washing, either generator may be selectively connected in the said loop circuit, which may be filled with water saturated with solvent from 323 which can be returned to source 323 when the water washing is concluded. Finally, if it is desired to use solvent to dissolve polymer deposit on the filters 340 and/or 341, solvent from 322 via line and three-way valves 323V may be fed to the filters, and be pumped therefrom by pump 346P, three-way valve 342V' or 343V' and line 322L'' for delivery therefrom. Since solvent and water are continuously fed as emulsified cement to separator 314, it is desirable that solvent and water in appropriate quantity be continuously withdrawn at 322VV' and 323N.

If it is desired to exclude the filters from the system, this may be accomplished by setting three-way valves 340V, 341V, to prevent flow through the filters and direct the flow through the filter by-pass line.

If it is desired to use the pump 320P in lieu of the pump 346P, this may be accomplished by turning the three-way valve 322V to deliver to the intake side of pump 320P, and opening the three-way valve 341V' to by-pass the pump 346P.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:
1. In the formation of a latex from an organic solvent dispersion of a composition of an organic solvent soluble or dispersible, water insoluble, macromolecular polymer or resin by a process of the type which comprises:
   1. providing a dispersion of the said composition in essentially water-immiscible volatile physical solvent which itself or as an azeotrope with water has a boiling point lower than that of water at atmospheric pressure,
   2. adding water and emulsifier to said dispersion in proportions to form an emulsion having water as its continuum and emulsifying the same so that the discontinuous phase thereof is in particles at least principally of precursor latex particle size,
   3. stripping the solvent from the emulsion to form a latex, and
   4. recovering the latex product, and which comprises the particular steps of:
   5. providing a moving flow of gas comprising steam as an initial continuous phase,
   6. dispersing the said emulsion into the flow of gas comprising steam as the initial continuous phase while subjecting the phases to a decrease of pressure and maintaining the temperature thereof below the limiting temperature for stability of the emulsion of particles of precursor latex particle size, thereby vaporizing solvent from the dispersed droplets and forming latex and vapors,
   7. establishing a separating zone maintained at a lower pressure, and establishing a flow of latex and water vapor into said separating zone,
   8. introducing into said separating zone the latex droplets and vapor produced by step (6) and impinging said droplets upon the flow of latex therein,
   9. withdrawing from said separating zone vapors therein resulting from steps 7 and 8, and
   10. withdrawing latex from said separating zone, the improvement which consists in the combination in the process of the further steps of:
   11. cooling and condensing the vapors withdrawn in step (9) to form a mixture of (a) said solvent in liquid form and (b) water containing some solvent,
   12. effecting separation of the liquid solvent (a) from said solvent-containing water (b),
   13. vaporizing a quantity of said solvent-containing water (b) sufficient to form at least a substantial part of the flow of gas comprising steam required by step (5), and
   14. providing the flow of gas in step (5) at least in substantial part from the flow of gas formed in step (13).

2. The improved process as claimed in claim 1, in which step (13) is effected in a vaporizer in which there may accumulate any of said macromolecular polymer or resin which may be entrained in the vapors withdrawn in step (9), and the improvement further comprises the steps of
   15. isolating said vaporizer from the process from time to time, and
   16. removing from said isolated vaporizer any macromolecular polymer or resin accumulated therein by circulating therethrough liquid solvent separated in step (12).

3. The improved process as claimed in claim 1, in which step (13) is effected selectively in one of two vaporizers in which there may accumulate any of said macromolecular polymer or resin which may be entrained in the vapors withdrawn in step (9), and the improvement further comprises the steps of
   15. from time to time using alternately the respective ones of said vaporizers in step (13) while isolating from the process the vaporizer not being so used, and
   16. circulating through the isolated vaporizer liquid solvent separated in step (12) for removing therefrom any macromolecular polymer or resin accumulated therein.

4. The improved process as claimed in claim 1, in which
   15. the latex withdrawn in step (10) is concentrated by vaporization of water therefrom, and the so vaporized water is at least in part combined with the vapors withdrawn in step (9).

5. The improved process as claimed in claim 1, in which
   15. the latex withdrawn in step (10) is concentrated by vaporization of water therefrom, and the so vaporized water is at least in part condensed and combined with the solvent-containing water (b) separated in step (12).

6. In the formation of a latex from an organic solvent dispersion of a composition of an organic solvent soluble or dispersible, water insoluble, macromolecular polymer or resin by a process of the type which comprises
   1. providing a dispersion of the said composition in essentially water-immiscible volatile physical solvent which itself or as an azeotrope with water has a boiling point lower than that of water at atmospheric pressure,
   2. adding water and emulsifier to said dispersion in proportions to form an emulsion having water as its continuum and emulsifying the same so that the discontinuous phase thereof is in particles at least principally of precursor latex particle size,
   3. stripping the solvent from the emulsion to form a latex, and
   4. recovering the latex product, and which comprises the particular steps of:
   5. providing a moving flow of gas comprising steam as an initial continuous phase,
   6. dispersing the said emulsion into the flow of gas comprising steam as the initial continuous phase while subjecting the phases to a decrease of pressure and maintaining a temperature for stability of the emulsion of particles of precursor latex particle size, thereby vaporizing solvent from the dispersed droplets and forming latex and vapors,
   7. establishing a separating zone maintained at a lower pressure,
   8. introducing into said separating zone the latex droplets and vapors produced by step (6),
   9. withdrawing vapors from said separating zone, and
   10. withdrawing latex from said separating zone,
the improvement which consists in the combination in the process of the further steps of:
   11. cooling and condensing the vapors withdrawn in step (9) to form a mixture of (a) said solvent in liquid form and (b) water containing some solvent,
   12. effecting separation of the liquid solvent (a) from said solvent-containing water (b).
   13. vaporizing a quantity of said solvent-containing water (b) sufficient to form at least a substantial part of the gas required by step (5), and
   14. providing the flow of gas in step (5) at least in substantial part from the flow of gas formed in step (13).

7. The improved process as claimed in claim 6, in which step (13) is effected in a vaporizer in which there may accumulate any of said macromolecular polymer or resin which may be entrained in the vapors withdrawn in step (9), and the improvement further comprises the steps of
   15. isolating said vaporizer from the process from time to time, and
   16. removing from said isolated vaporizer any macromolecular polymer or resin accumulated therein by circulating therethrough liquid solvent separated in step (12).

8. The improved process as claimed in claim 6, in which step (13) is effected selectively in one of two vaporizers in which there may accumulate any of said macromolecular polymer or resin which may be entrained in the vapors withdrawn in step (9) and the improvement further comprises the steps of
   15. from time to time using alternately the respective ones of said vaporizers in step (13) while isolating from the process the vaporizer not being so used, and
   16. circulating through the isolated vaporizer liquid solvent separated in step (12) for removing therefrom any macromolecular polymer or resin accumulated therein.

9. The improved process as claimed in claim 6, in which
   15. the latex withdrawn in step (10) is concentrated by vaporization of water therefrom, and the so vaporized water is at least in part combined with the vapors withdrawn in step (9).

10. The improved process as claimed in claim 6, in which
   15. the latex withdrawn in step (10) is concentrated by vaporization of water therefrom and the so vaporized water is at least in part condensed and combined with said solvent-containing water (b) separated in step (12).

11. The improved process as claimed in claim 6, in which the improvement further comprises the step that
   15. between steps (12) and (13) the solvent-containing water (b) to be vaporized in step (b) is filtered before said vaporization.

12. The improved process as claimed in claim 11, in which step (15) is affected in a filter in which there may be accumulated macromolecular polymer or resin which may be entrained in the vapors withdrawn in step (9), and the improvement further comprises the steps of
16. isolating said filter from the process from time to time, and
17. removing from said isolated filter any macromolecular polymer or resin accumulated therein by circulating therethrough liquid solvent separated in step (12).

13. The improved process as claimed in claim 12, which further comprises the step of
18. delivering the solvent effluent from step (17) with any macromolecular polymer or resin dissolved therein to step (1) for forming the dispersion therein.

* * * * *